United States Patent
Kim et al.

(10) Patent No.: US 9,562,178 B2
(45) Date of Patent: Feb. 7, 2017

(54) POLYVINYLALCOHOL BASED RESIN ADHESIVE FOR POLARIZING PLATE, POLARIZING PLATE INCLUDING SAME, AND AN IMAGE DISPLAY DEVICE

(71) Applicant: LG CHEM, LTD., Seoul (KR)

(72) Inventors: Ji-Young Kim, Daejeon (KR); Ji-Young Kim, Daejeon (KR); Kyun-Il Rah, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/910,943

(22) PCT Filed: Sep. 30, 2014

(86) PCT No.: PCT/KR2014/009166
§ 371 (c)(1),
(2) Date: Feb. 8, 2016

(87) PCT Pub. No.: WO2015/064920
PCT Pub. Date: May 7, 2015

(65) Prior Publication Data
US 2016/0298004 A1 Oct. 13, 2016

(30) Foreign Application Priority Data

| | | |
|---|---|---|
| Oct. 31, 2013 | (KR) | 10-2013-0131797 |
| Oct. 31, 2013 | (KR) | 10-2013-0131799 |
| Sep. 25, 2014 | (KR) | 10-2014-0128309 |
| Sep. 25, 2014 | (KR) | 10-2014-0128310 |

(51) Int. Cl.
C09J 129/04 (2006.01)
G02B 5/30 (2006.01)
G02F 1/1335 (2006.01)
G02B 1/14 (2015.01)

(52) U.S. Cl.
CPC ............ *C09J 129/04* (2013.01); *G02B 1/14* (2015.01); *G02B 5/3025* (2013.01); *G02F 1/133528* (2013.01); *C09J 2203/318* (2013.01)

(58) Field of Classification Search
None
See application file for complete search history.

(56) References Cited

U.S. PATENT DOCUMENTS

| | | | |
|---|---|---|---|
| 3,668,166 A * | 6/1972 | Kane | C09J 129/04 524/253 |
| 3,839,307 A * | 10/1974 | Schmifg | B01J 13/0065 524/557 |
| 5,804,618 A | 9/1998 | Mafoti et al. | |
| 2009/0142517 A1 | 6/2009 | Takeko et al. | |
| 2013/0143734 A1 | 6/2013 | Yoshihiro et al. | |

FOREIGN PATENT DOCUMENTS

| | | |
|---|---|---|
| JP | 10-130609 A | 5/1998 |
| JP | 2006-0276574 A | 10/2006 |
| JP | 2008-115352 A | 5/2008 |
| JP | 2012-0177890 A | 9/2012 |
| KR | 10-2009-0020641 A | 2/2009 |

OTHER PUBLICATIONS

English language machine translation of JP 2012-177890A, Sep. 2012.*

* cited by examiner

*Primary Examiner* — Ramsey Zacharia
(74) *Attorney, Agent, or Firm* — Dentons US LLP

(57) ABSTRACT

The present invention relates to an adhesive for a polarizing plate including a polyvinyl alcohol-based resin, a titanium lactate ammonium salt, hydroxycarboxylic acid and water, and having a pH of 3.5 to 6.5, thereby having improved adhesive strength and water resistance, and a polarizing plate and an image display device including the same.

13 Claims, 4 Drawing Sheets

POLYVINYLALCOHOL BASED RESIN ADHESIVE FOR POLARIZING PLATE, POLARIZING PLATE INCLUDING SAME, AND AN IMAGE DISPLAY DEVICE

This application is a National Stage Entry of International Application No. PCT/KR2014/009166, filed Sep. 30, 2014, and claims the benefit of Korean Application No. 10-2013-0131797, filed on Oct. 31, 2013, Korean Application No. 10-2013-0131799, filed Oct. 31, 2013, Korean Application No. 10-2014-0128309, filed Sep. 25, 2014, and Korean Application No. 10-2014-0128310, filed Sep. 25, 2014, all of which are hereby incorporated by reference in their entirety for all purposes as if fully set forth herein.

TECHNICAL FIELD

The present invention relates to an adhesive for a polarizing plate for attaching a protective film or a compensation film to a polarizer, and a polarizing plate using the same, and more particularly, to an adhesive for a polarizing plate having improved water resistance as an aqueous adhesive including a polyvinyl alcohol-based resin, and a polarizing plate and an image display device including the same.

BACKGROUND ART

Polarizing plates used for various image display devices such as liquid crystal display devices, plasma display devices and electroluminescence devices have a structure including a polarizer formed with a polyvinyl alcohol-based film, and a protective film formed on at least one surface of the polarizer. Meanwhile, polyvinyl alcohol-based adhesives are mainly used as an adhesive for a polarizing plate for attaching the polarizer and the protective film.

However, polyvinyl alcohol-based resin adhesives are a water-soluble polymer, therefore, have a problem in that the polarizer and the protective film are peeled off since the adhesive is dissolved under high humidity conditions.

In view of the above, methods of modifying a polyvinyl alcohol-based resin by adding an acetoacetyl group thereto, copolymerizing a hydrophobic vinyl monomer such as ethyl acrylate, methyl acrylate, acrylic acid and methacrylic acid, or mixing a cross-linking agent such as glyoxylate or an amine metal salt to a polyvinyl alcohol-based resin have been proposed.

Polyvinyl alcohol-based adhesives prepared using the methods described above tend to have somewhat improved water resistance compared to when polyvinyl alcohol is used alone, however, there is still a problem in that water resistance and adhesive strength are not sufficient when the adhesives are used in high-speed production lines. In addition, modified polyvinyl alcohol-based resin adhesives have a problem in that stains are resulted under alkaline pH conditions, and methods of mixing a cross-linking agent also have a problem in that optical properties of a polarizing plate are degraded depending on the amount of the cross-linking agent used.

Accordingly, adhesives for adhering a polarizer and a protective film having an excellent adhesive property and water resistance while maintaining optical properties of a polarizing plate have been required.

DISCLOSURE

Technical Problem

In view of the above, an object of the present invention is to provide an adhesive for a polarizing plate having excellent water resistance.

Another object of the present invention is to provide a polarizing plate having excellent water resistance by including the adhesive for a polarizing plate according to one embodiment of the present invention, and an image display device including the same.

Technical Solution

According to one embodiment of the present invention, there is provided an adhesive for a polarizing plate including a polyvinyl alcohol-based resin, a titanium lactate ammonium salt, hydroxycarboxylic acid and water, and having a pH of 3.5 to 6.5.

Herein, the polyvinyl alcohol-based resin preferably includes one or more types selected from the group consisting of an acetoacetyl group-modified polyvinyl alcohol-based resin, a cation-modified polyvinyl alcohol-based resin and an anion-modified polyvinyl alcohol-based resin.

Herein, the hydroxycarboxylic acid is preferably a compound represented by the following Chemical Formula 2.

[Chemical Formula 2]

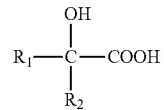

(In Chemical Formula 2, $R_1$ and $R_2$ are each independently a $C_{1-5}$ alkyl group substituted with a hydroxyl group or a carboxyl group, an unsubstituted $C_{1-5}$ alkyl group, hydrogen or a hydroxyl group.)

Herein, the hydroxycarboxylic acid preferably includes one or more types selected from the group consisting of lactic acid, citric acid, glycolic acid, malic acid, tartaric acid, glyceric acid and gluconic acid.

The adhesive for a polarizing plate preferably includes the titanium lactate ammonium salt in 30 to 150 parts by weight; the hydroxycarboxylic acid in 1 to 13 parts by weight; and the water in 1000 to 10000 parts by weight with respect to 100 parts by weight of the polyvinyl alcohol-based resin.

In addition, in the adhesive for a polarizing plate, a weight ratio between the titanium lactate ammonium salt and the hydroxycarboxylic acid is preferably 4:1 to 25:1.

According to another embodiment of the present invention, there is provided a polarizing plate, in which a polarizer and a polymer film adhere using the adhesive for a polarizing plate according to one embodiment of the present invention.

Herein, when the polarizing plate is left for 24 hours at a temperature of 60° C. and relative humidity of 100%, a percentage of the peeled area is preferably 10% or less with respect to the total area.

Furthermore, according to still another embodiment of the present invention, there is provided an image display device including the polarizing plate according to one embodiment of the present invention.

Advantageous Effects

According to one embodiment of the present invention, an adhesive for a polarizing plate including a polyvinyl alcohol-based resin, a titanium lactate ammonium salt, hydroxycarboxylic acid and water, and having a pH of 3.5 to 6.5 has excellent water resistance.

Consequently, a polarizing plate including the adhesive maintains adhesive strength between a polarizer and a polymer film even under high humidity conditions, and maintains optical properties, and is effective in reducing a peel-off phenomenon.

MODE FOR DISCLOSURE

Figure 1:
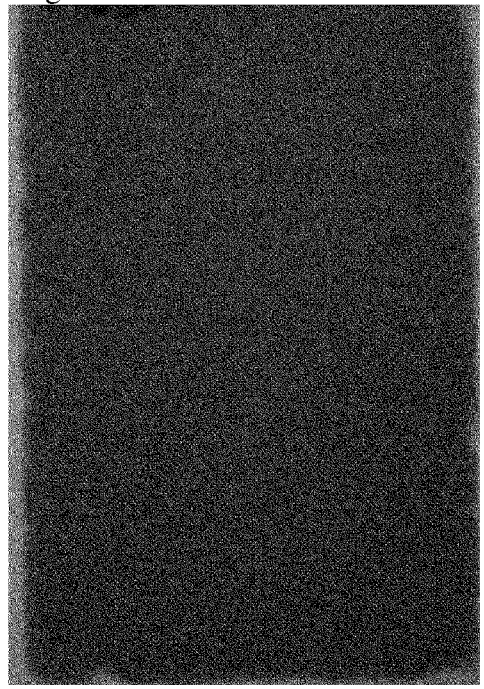
FIG. 1 is a photograph of the surface of a polarizing plate prepared in Example 1 after water resistance evaluation.
Figure 2:
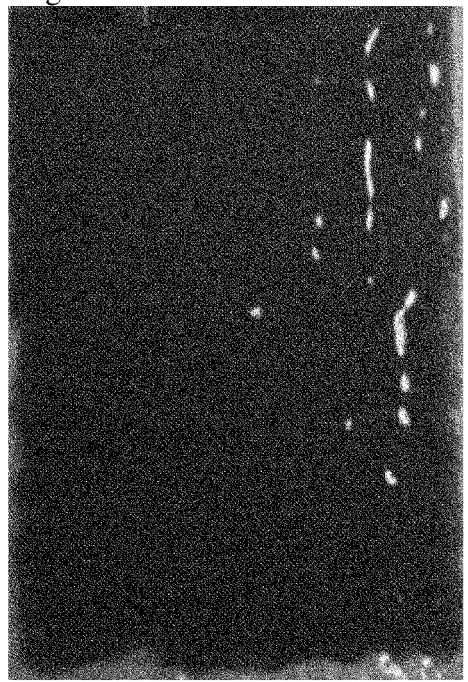
FIG. 2 is a photograph of the surface of a polarizing plate prepared in Example 5 after water resistance evaluation.
Figure 3:
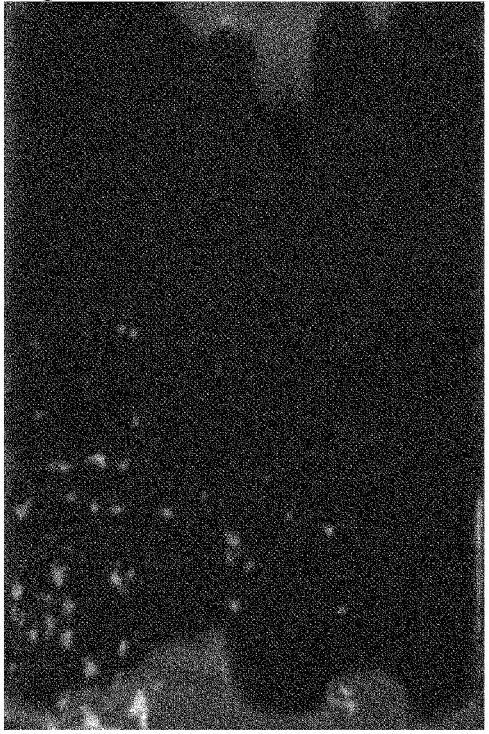
FIG. 3 is a photograph of the surface of a polarizing plate prepared in Example 6 after water resistance evaluation.
Figure 4:
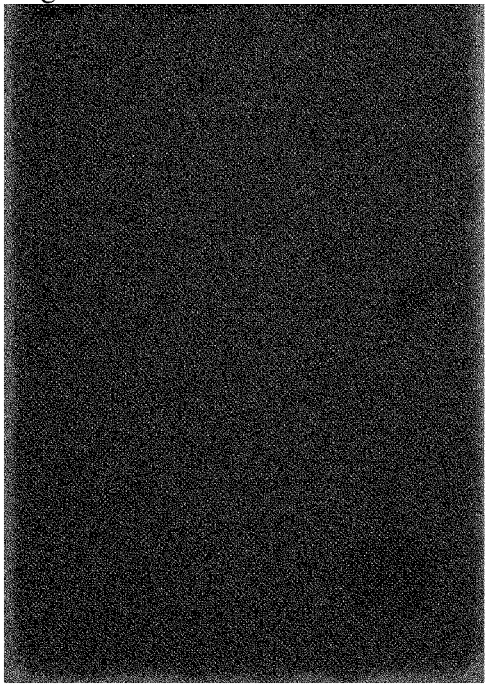
FIG. 4 is a photograph of the surface of a polarizing plate prepared in Example 8 after water resistance evaluation.

Hereinafter, preferred embodiments of the present invention will be described. However, embodiments of the present invention may be modified to various other forms, and the scope of the present invention is not limited to the embodiments described below. In addition, embodiments of the present invention are provided in order to more completely describe the present invention for those having average knowledge in the art.

As a result of extensive studies for developing an adhesive for a polarizing plate having excellent water resistance by stably maintaining optical properties and adhesive strength even under high humidity conditions, the inventors of the present invention have found that, when a polyvinyl alcohol-based resin, a titanium lactate ammonium salt, hydroxycarboxylic acid and water are mixed and used, adhesive strength and optical properties are superior even in high temperature and high humidity conditions, and completed the present invention.

More specifically, an adhesive for a polarizing plate of the present invention includes a polyvinyl alcohol-based resin, a titanium lactate ammonium salt, hydroxycarboxylic acid and water, and has a pH of 3.5 to 6.5.

Herein, the polyvinyl alcohol-based resin plays a role of providing an adhesive property, and various polyvinyl alcohol-based resins known to be generally used as an aqueous adhesive for a polarizing plate may be used as the polyvinyl alcohol-based resin without particular limit. For example, in the present invention, a modified polyvinyl alcohol-based resin as well as a unmodified polyvinyl alcohol-based resin may be used as the polyvinyl alcohol-based resin, and examples of such a modified polyvinyl alcohol-based resin may include one or more types selected from the group consisting of an acetoacetyl group-modified polyvinyl alcohol-based resin, a cation-modified polyvinyl alcohol-based resin and an anion-modified polyvinyl alcohol-based resin. Using a modified polyvinyl alcohol-based resin is more preferable compared to using an unmodified polyvinyl alcohol-based resin since there is an advantage in that water resistance of an adhesive layer is enhanced.

Meanwhile, among the modified polyvinyl alcohol-based resins described above, using an acetoacetyl group-modified polyvinyl alcohol resin is preferable. An acetoacetyl group has high reactivity, therefore, high durability may be obtained by high cross-linkage when an acetoacetyl group is used in an adhesive for a polarizing plate. Acetoacetyl group-modified polyvinyl alcohol may be obtained by reacting a polyvinyl alcohol-based resin and diketene using known methods. Specifically, a method of dispersing a polyvinyl alcohol-based resin into a solvent such as acetic acid, and adding diketene thereto, a method of dissolving a polyvinyl alcohol-based resin in a solvent such as dimethylformamide or dioxane in advance, and adding diketene thereto, and a method of directly contacting diketene gas or liquid diketene to polyvinyl alcohol, and the like, may be used.

Meanwhile, the adhesive of the present invention may include two or more types of the modified polyvinyl alcohol-based resin described above, or may include an unmodified polyvinyl alcohol-based resin and all of the modified polyvinyl alcohol-based resins described above.

Meanwhile, the degree of polymerization of the polyvinyl alcohol-based resin is preferably 500 to 3000, and more preferably 1000 to 2000. When the degree of polymerization is 500 or greater, it is preferable in that durability and heat resistance are excellent. Meanwhile, when the degree of polymerization is 3000 or less, viscosity does not increase excessively, therefore, it is preferable in that an adhesive layer may be formed uniformly.

In addition, the degree of saponification of the polyvinyl alcohol-based resin is preferably 80 to 100 mol %, and more preferably 90 to 99 mol %. When the degree of saponification is 80 mol % or greater, it is preferable in that durability and heat resistance are excellent.

Meanwhile, the titanium lactate ammonium salt is included in the aqueous adhesive for a polarizer, and plays a role of improving an adhesive property for a polarizer, and enhancing water resistance of the adhesive.

Generally, a titanium lactate ammonium salt may bond to both the hydroxyl group and the acetoacetyl group of an acetoacetyl group-modified polyvinyl alcohol, thereby plays a role of a cross-linking agent of a polyvinyl alcohol-based resin. Titanium alkoxide that has been normally used in the art has had a problem in that, when the number of ligand carbons is small, white precipitates occur since polymerization in the form of titanium oxide frequently occurs due to a condensation reaction in an aqueous solution. In addition, when the number of ligand carbons of the titanium alkoxide increases, there has been a problem in that solubility for water decreases. Meanwhile, a titanium lactate ammonium salt has excellent solubility for water, therefore, may be used as a cross-linking agent of polyvinyl alcohol without a problem of precipitate generation in an aqueous solution.

More specifically, the titanium lactate ammonium may be a compound represented by the following Chemical Formula 1.

[Chemical Formula 1]

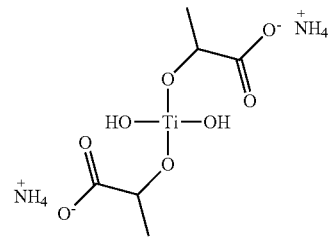

The titanium lactate ammonium may be included in approximately 30 to 150 parts by weight, preferably included in approximately 35 to 110 parts by weight, and more preferably included in approximately 45 to 65 parts by weight, with respect to 100 parts by weight of the solid content of the polyvinyl alcohol-based resin. When the content of the titanium lactate ammonium satisfies the above range, sufficient water resistance may be revealed, and adhesive strength and optical properties may also be maintained.

Next, the hydroxyl group of the hydroxycarboxylic acid may have bonding to the carboxyl group of the titanium lactate in an aqueous solution thereby produce a structure in which the chain length of the lactate salt increases. By increasing the chain length of the lactate salt, the increased hydrophobicity assists to enhance the water resistance, and the increased chain length structure of lactate salt plays a role of increasing the stability of the titanium lactate ammonium salt.

The hydroxycarboxylic acid is an organic compound having a hydroxyl group and a carboxyl group in the molecule, and although not limited thereto, may be a compound represented by the following Chemical Formula 2.

[Chemical Formula 2]

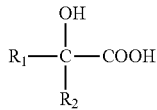

In Chemical Formula 2, $R_1$ and $R_2$ are each independently a $C_{1-5}$ alkyl group substituted with a hydroxyl group or a carboxyl group, an unsubstituted $C_{1-5}$ alkyl group, hydrogen or a hydroxyl group. Preferably, $R_1$ may be an unsubstituted $C_{1-5}$ alkyl group, a $C_{1-5}$ alkyl group substituted with a hydroxyl group, hydrogen or a hydroxyl group, and $R_2$ may be hydrogen.

More specifically, the hydroxycarboxylic acid may include, but is not limited to, lactic acid, citric acid, glycolic acid, malic acid, tartaric acid, glyceric acid, gluconic acid and the like, and among these, lactic acid, glycolic acid, malic acid or the like is particularly more preferable. Meanwhile, the hydroxycarboxylic acid may be used either alone or as a mixture of two or more types.

The added amount of the hydroxycarboxylic acid may be approximately 1 to 13 parts by weight, and preferably approximately 3 to 11 parts by weight, with respect to 100 parts by weight of the solid content of the polyvinyl alcohol-based resin. When the content of the hydroxycarboxylic acid satisfies the above range, effects of enhancing water resistance and improving the stability of the titanium lactate ammonium may be obtained.

Lastly, the adhesive of the present invention includes water. Water used in the adhesive is not particularly limited and includes pure water, ultrapure water, tap water and the like, however, pure water or ultrapure water is preferable in terms of maintaining uniformity and transparency of the adhesive layer formed. Herein, the content of the water is not particularly limited, but is preferably included in 1000 to 10000 parts by weight and more preferably in 1000 to 5000 parts by weight with respect to 100 parts by weight of the solid content of the polyvinyl alcohol-based resin. When the water is included in greater than 10000 parts by weight with respect to 100 parts by weight of the solid content of the polyvinyl alcohol-based resin, the adhesive property tends to be readily degraded, and when included in less than 1000 parts by weight, optical properties of the obtained polarizing plate tend to be readily degraded.

Herein, the adhesive for a polarizing plate of the present invention preferably has a pH of 3.5 to 6.5, and more preferably 4 to 6. When the pH of the adhesive for a polarizing plate satisfies the above range, effects of enhancing water resistance may be obtained while maintaining the bonding between the titanium lactate and the hydroxycarboxylic acid. When the pH of the adhesive shows basic, the titanium lactate ammonium salt may form insoluble titanium oxide by a condensation reaction causing the generation of precipitates, and as a result, bonding with the hydroxycarboxylic acid may be difficult. However, when the pH of the adhesive shows acidic or neutral, the titanium lactate ammonium salt may have a stable form in an aqueous solution, and bonding between the titanium lactate ammonium and the added hydroxycarboxylic acid may be maintained.

Herein, the pH of the adhesive for a polarizing plate may be adjusted by adjusting the content of the titanium lactate ammonium salt and the hydroxycarboxylic acid, or adding other additives. For example, although not limited thereto, an aqueous ammonia solution ($NH_4OH$), sodium hydroxide (NaOH) and potassium hydroxide (KOH) and the like may be included as an additional additive.

Meanwhile, a method for preparing the adhesive for a polarizing plate is not particularly limited, and known methods may be used. For example, a method of obtaining an aqueous solution including a fixed amount of a polyvinyl alcohol-based resin, and then adding an aqueous titanium lactate ammonium salt solution and hydroxycarboxylic acid each to the aqueous solution obtained above, or a method of obtaining a cross-linking agent by mixing an aqueous titanium lactate ammonium salt solution and hydroxycarboxylic acid first, adding the cross-linking agent to an aqueous solution including a polyvinyl alcohol-based resin, and stirring the result may all be used.

Meanwhile, in the adhesive for a polarizing plate of the present invention, the weight ratio between the titanium lactate ammonium salt and the hydroxycarboxylic acid is preferably approximately 4:1 to 25:1, and more preferably approximately 5:1 to 20:1.

As examined above, the hydroxyl group of the hydroxycarboxylic acid bonds to the carboxyl group of the titanium lactate ammonium salt producing a structure in which the chain length of the lactate salt increases, and thereby increasing hydrophobicity of the adhesive. Accordingly, when the content of the hydroxycarboxylic acid is less than the above range, the hydroxycarboxylic acid and the titanium lactate ammonium salt may not bond sufficiently, and when the content is greater than the above range, the hydroxycarboxylic acid may inhibit the reaction between the titanium lactate ammonium salt and the polyvinyl alcohol-based resin. Therefore, when the content satisfies the above range, the titanium lactate ammonium salt and the hydroxycarboxylic acid bond thereby stably form a structure capable of contributing to the enhancement of water resistance.

Additives such as an ultraviolet ray absorbent, an antioxidant, a stabilizer and a silane coupling agent may be added to the adhesive. An adhesive having target properties may be obtained by adding the corresponding additives.

Next, a polarizing plate according to the present invention will be described.

A polarizing plate of the present invention includes a polarizer; a polymer film attached to one or both surfaces of the polarizer; and an adhesive layer for attaching the polarizer and the polymer film, wherein the adhesive layer is formed with an adhesive for a polarizing plate including a polyvinyl alcohol-based resin, a titanium lactate ammonium salt, hydroxycarboxylic acid and water, and having a pH of 3.5 to 6.5.

Herein, the polarizer is not particularly limited, and polarizers well known in the art, for example, films formed with polyvinyl alcohol (PVA) including iodine or dichroic dye may be used. In the present specification, a polarizer means a state not including a protective film, and a polarizing plate means a state in which a protective film or a compensation film is attached.

Next, the polymer film is a polarizer protective film or a compensation film for compensating optical properties of a polarizer, and polymer films known in the art may be used.

More specifically, examples of the polymer film may include, but are not limited to, at least one selected from the group consisting of an acryl-based film, a PET film, an acryl-based primer-treated PET film, a polynorbornene (PNB)-based film, a COP film, a polycarbonate film, and a TAC film including NRT (Fujifilm), N TAC (Konica), V TAC (Fujifilm), UZ TAC (Fujifilm) and the like.

Particularly, a cellulose-based film such as cellulose ester, a triacetyl cellulose film (TAC film), cellulose propionate, cellulose acetate propionate, cellulose diacetate and a cellulose acetate butyrate film, a polycarbonate-based film (PC film), a polystyrene-based film, a polyacrylate-based film, a norbornene resin-based film and a polysulfone-based film are preferable in terms of transparency, mechanical properties, and the absence of optical anisotropy. A triacetyl cellulose film (TAC film) and a carbonate film (PC film) are more preferable since these films are readily prepared and have excellent processability, and a TAC film is mostly preferable due to a polarization property or durability.

The surface of the polymer film may be modified in order to enhance adhesive strength and a sticking property for a polarizer to which the polymer film adheres. Specific examples of the surface treatment includes, but are not limited to, corona treatment, glow discharge treatment, flame treatment, acid treatment, alkali treatment, plasma treatment, ultrasonic treatment and ultraviolet irradiation treatment and the like. In addition, a method of providing an undercoat layer to a protective film for improving an adhesive property may be used.

Next, the adhesive layer is formed by the adhesive for a polarizing plate of the present invention described above. Specific descriptions on the adhesive for a polarizing plate are the same as those described above, therefore, specific descriptions will not be repeated.

Meanwhile, the thickness of the adhesive layer formed by such an adhesive for a polarizing plate of the present invention described above may be approximately 0.03 to 5 μm, and preferably approximately 0.03 to 1 μm. When the thickness of the adhesive layer is less than 0.03 μm, uniformity and adhesive strength of the adhesive layer may be reduced, and when the thickness of the adhesive layer is greater than 5 μm, there may be a problem in that the costs increase and the exterior of a polarizing plate gets wrinkled.

Meanwhile, the polarizing plate according to the present invention may be prepared using polarizing plate preparation methods known in the art. For example, the polarizing plate according to the present invention may be prepared using a method of applying the adhesive of the present invention on at least one surface of a polarizer, a polarizer protective film or a compensation film, laminating a polymer film on one or both surfaces of the polarizer, and then curing the adhesive through heat treatment, however, the method is not limited thereto. Herein, the heat treatment condition may be properly adjusted depending on target physical properties of the adhesive.

A polarizing plate prepared by gluing a polarizer and a polymer film using the adhesive according to one embodiment of the present invention has excellent water resistance due to the adhesive, and adhesive strength between the polarizer and the polymer film and optical properties of the polarizing plate are maintained even under high humidity conditions.

Specifically, as will be examined in the test example below, the polarizer has a peeled area percentage of 10% or less and preferably 5% or less with respect to the total area when the polarizer is left for 24 hours at a temperature of 60° C. and relative humidity of 100%. When the percentage of the peeled area is greater than 10% under the condition described above, problems of durability and optical property degradation of the polarizing plate, and merchantability decrease occur, and the polarizer may be difficult to commercialize.

The polarizer of the present invention according to the examples has a peeled area percentage of 10% or less, therefore has very excellent water resistance. Furthermore, the polarizing plate using the adhesive for a polarizing plate according to the present invention has excellent optical properties.

Specifically, the polarizing plate according to the present invention preferably has single body transmittance (Ts) of approximately 41% to 45%, and a degree of polarization of 99.90% or greater, and more preferably has single body transmittance of approximately 42% to 44% and a degree of polarization of 99.95% or higher.

In addition, as a suitable color of the polarizing plate according to the present invention, a single body color a value is preferably −3 to −1, a single body color b value is preferably 3.0 to 5.5, an orthogonal color a value is preferably 0.1 to 0.6 and an orthogonal color b value is preferably −1.5 to 0.5, however, the values are not limited thereto.

The single body color used herein refers to color obtained when irradiating natural light on one polarizing plate, and the orthogonal color means color obtained when irradiating natural light on two polarizing plates in which another polarizing plate is laminated on one polarizing plate so that the absorption axes are orthogonal to each other at a right angle.

In addition, the color a and the color b refer to a value representing color in a CIE coordinate system, and more specifically, the color a value is calculated by $a=500[(X/Xn)^{1/3}-(Y/Yn)^{1/3}]$, and +a means red and −a means green. Furthermore, the color b value is calculated by $b=200[(Y/Yn)^{1/3}-(Z/Zn)^{1/3}]$, and +b means yellow and −b means blue. (Herein, Xn, Yn and Zn correspond to X, Y and Z of white color, which is a reference.)

In other words, the single body color a and b values mean color a and b values in a CIE coordinate system measuring single polarizer color using a color-difference meter, and the orthogonal color a and b values mean color a and b values in a CIE coordinate system measuring color when a pair of polarizers are disposed so that the absorption axes are orthogonal using a color-difference meter.

When the color is outside the color (single body color a, single body color b, orthogonal color a, orthogonal color b) range, color reproducibility may be difficult to obtain. In addition, the color value has correlation with single body transmittance and a degree of polarization, therefore, the color range represents a range capable of selective mass production according to specifications that clients require.

Meanwhile, such a polarizing plate of the present invention described above may be favorably used for image display devices such as liquid crystal display devices. Examples of the image display device may include a liquid crystal display device including a liquid crystal panel, and polarizing plates each provided on both surfaces of this liquid crystal panel, and herein, at least one of the polarizing plates may be the polarizing plate according to the present invention. Herein, the types of the liquid crystal panel included in the liquid crystal display device are not particularly limited. For example, known panels including panels using a passive matrix method such as a twisted nematic (TN) type, a super twisted nematic (STN) type, a ferroelectric (F) type or a polymer dispersed (PD) type; panels using an active matrix method such as a two terminal type or a three terminal type; and an in plane switching (IPS) panel and a vertical alignment (VA) type panel may all be used without being limited by the types. In addition, types of other constitutions forming a liquid crystal display device such as upper and lower substrates (ex. color filter substrate or array substrate) are not particularly limited as well, and constitutions known in the art may be employed without limit.

Hereinafter, the present invention will be described in more detail with reference to examples. However, the following examples are for illustrative purposes only, and the present invention is not limited thereto.

PREPARATION EXAMPLE

Preparation of Adhesive

Preparation Example 1

Acetoacetyl group-modified polyvinyl alcohol (average degree of polymerization 1100, degree of saponification 99%) was dissolved in pure water at 80° C. to prepare a 4% by weight aqueous solution (250 g). Next, as shown in the following Table 1, a cross-linking agent was prepared by adding a titanium lactate ammonium salt in 46 parts by weight (4.6 g) and lactic acid in 3.0 parts by weight (0.3 g) to pure water with respect to 100 parts by weight of the solid content of the modified polyvinyl alcohol-based resin. After that, the aqueous modified polyvinyl alcohol solution and the prepared cross-linking agent were mixed, and pure water was added thereto, and as a result, an adhesive having a pH of 4.4 was prepared.

Preparation Example 2

An adhesive having a pH of 3.9 was prepared in the same manner as in Example 1 except that a cross-linking agent was prepared by adding a titanium lactate ammonium salt in 38 parts by weight (3.8 g) and lactic acid in 5.9 parts by weight (0.59 g) to pure water with respect to 100 parts by weight of the solid content of the polyvinyl alcohol-based resin.

Preparation Example 3

An adhesive having a pH of 4.0 was prepared in the same manner as in Example 1 except that a cross-linking agent was prepared by adding a titanium lactate ammonium salt in 46 parts by weight (4.6 g) and lactic acid in 7.0 parts by weight (0.7 g) to pure water with respect to 100 parts by weight of the solid content of the polyvinyl alcohol-based resin.

Preparation Example 4

An adhesive having a pH of 4.0 was prepared in the same manner as in Example 1 except that a cross-linking agent was prepared by adding a titanium lactate ammonium salt in 61 parts by weight (6.1 g) and lactic acid in 9.4 parts by weight (0.94 g) to pure water with respect to 100 parts by weight of the solid content of the polyvinyl alcohol-based resin.

Preparation Example 5

An adhesive having a pH of 3.8 was prepared in the same manner as in Example 1 except that a cross-linking agent was prepared by adding a titanium lactate ammonium salt in 61 parts by weight (6.1 g) and lactic acid in 11 parts by weight (1.1 g) to pure water with respect to 100 parts by weight of the solid content of the polyvinyl alcohol-based resin.

Preparation Example 6

An adhesive having a pH of 4.4 was prepared in the same manner as in Example 1 except that a cross-linking agent was prepared by adding a titanium lactate ammonium salt in 107 parts by weight (10.7 g) and lactic acid in 8.7 parts by weight (0.87 g) to pure water with respect to 100 parts by weight of the solid content of the polyvinyl alcohol-based resin.

Preparation Example 7

An adhesive having a pH of 3.9 was prepared in the same manner as in Example 1 except that a cross-linking agent was prepared by adding a titanium lactate ammonium salt in 58 parts by weight (5.8 g) and lactic acid in 8.8 parts by weight (0.88 g) to pure water with respect to 100 parts by weight of the solid content of the polyvinyl alcohol-based resin.

Preparation Example 8

An adhesive having a pH of 5.0 was prepared by adding an aqueous ammonia solution ($NH_4OH$, 25%) to the adhesive prepared in Preparation Example 7.

Preparation Example 9

An adhesive having a pH of 6.0 was prepared by adding an aqueous ammonia solution ($NH_4OH$, 25%) to the adhesive prepared in Preparation Example 7.

Preparation Example 10

An adhesive having a pH of 3.8 was prepared in the same manner as in Example 1 except that a cross-linking agent was prepared by adding a titanium lactate ammonium salt in 38 parts by weight (3.8 g) and glycolic acid in 5.9 parts by weight (0.59 g) to pure water with respect to 100 parts by weight of the solid content of the polyvinyl alcohol-based resin.

Preparation Example 11

An adhesive having a pH of 3.9 was prepared in the same manner as in Example 1 except that a cross-linking agent was prepared by adding a titanium lactate ammonium salt in 38 parts by weight (3.8 g) and malic acid in 5.9 parts by weight (0.59 g) to pure water with respect to 100 parts by weight of the solid content of the polyvinyl alcohol-based resin.

Preparation Example 12

An adhesive having a pH of 4.0 was prepared in the same manner as in Example 1 except that a cross-linking agent was prepared by adding a titanium lactate ammonium salt in 38 parts by weight (3.8 g) and citric acid in 5.9 parts by weight (0.59 g) to pure water with respect to 100 parts by weight of the solid content of the polyvinyl alcohol-based resin.

Preparation Example 13

After acetoacetyl group-modified polyvinyl alcohol (average degree of polymerization 1100, degree of saponification 99%) was dissolved in pure water at 80° C. to prepare a 4% by weight aqueous solution (250 g), an adhesive having a pH of 6.2 was prepared by adding a titanium lactate ammonium salt (50% aqueous solution) in 46 parts by weight (9.2 g) thereto with respect to 100 parts by weight of the solid content of the polyvinyl alcohol-based resin.

Preparation Example 14

After acetoacetyl group-modified polyvinyl alcohol (average degree of polymerization 1100, degree of saponification 99%) was dissolved in pure water at 80° C. to prepare a 4% by weight aqueous solution (250 g), an adhesive having a pH of 5.7 was prepared by adding sodium glyoxylate (10% aqueous solution) in 10 parts by weight (10 g) thereto with respect to 100 parts by weight of the solid content of the polyvinyl alcohol-based resin.

Preparation Example 15

After acetoacetyl group-modified polyvinyl alcohol (average degree of polymerization 1100, degree of saponification 99%) was dissolved in pure water at 80° C. to prepare a 4% by weight aqueous solution (250 g), an adhesive having a pH of 8.6 was prepared by adding titanium diisopropoxy bis (triethanolaminate) (8% aqueous solution) in 20 parts by weight (25 g) thereto with respect to 100 parts by weight of the solid content of the polyvinyl alcohol-based resin.

Preparation Example 16

After acetoacetyl group-modified polyvinyl alcohol (average degree of polymerization 1100, degree of saponification 99%) was dissolved in pure water at 80° C. to prepare a 4% by weight aqueous solution (250 g), an adhesive was prepared by adding tetraisopropyl titanate in 58 parts by weight (5.8 g) and lactic acid in 8.8 parts by weight (0.88 g) thereto with respect to 100 parts by weight of the solid content of the polyvinyl alcohol-based resin.

Preparation Example 17

An adhesive having a pH of 7.0 was prepared by adding an aqueous ammonia solution ($NH_4OH$, 25%) to the adhesive prepared in Preparation Example 7.

Preparation Example 18

An adhesive having a pH of 2.0 was prepared by adding 0.1 M hydrochloric acid to the adhesive prepared in Preparation Example 7.

TABLE 1

| Category | Polyvinyl alcohol-Based Resin (Parts by Weight) | Cross-linking Agent (Parts by Weight) | Hydroxycarboxylic Acid (Parts by Weight) | pH |
|---|---|---|---|---|
| Preparation Example 1 | 100 | Titanium Lactate Ammonium Salt (46) | Lactic Acid (3.0) | 4.4 |
| Preparation Example 2 | 100 | Titanium Lactate Ammonium Salt (38) | Lactic Acid (5.9) | 3.9 |
| Preparation Example 3 | 100 | Titanium Lactate Ammonium Salt (46) | Lactic Acid (7.0) | 4.0 |
| Preparation Example 4 | 100 | Titanium Lactate Ammonium Salt (61) | Lactic Acid (9.4) | 4.0 |
| Preparation Example 5 | 100 | Titanium Lactate Ammonium Salt (61) | Lactic Acid (11) | 3.8 |
| Preparation Example 6 | 100 | Titanium Lactate Ammonium Salt (107) | Lactic Acid (8.7) | 4.4 |
| Preparation Example 7 | 100 | Titanium Lactate Ammonium Salt (58) | Lactic Acid (8.8) | 3.9 |
| Preparation Example 8 | 100 | Titanium Lactate Ammonium Salt (58) | Lactic Acid (8.8) | 5.0 |
| Preparation Example 9 | 100 | Titanium Lactate Ammonium Salt (58) | Lactic Acid (8.8) | 6.0 |
| Preparation Example 10 | 100 | Titanium Lactate Ammonium Salt(38) | Glycolic Acid (5.9) | 3.8 |
| Preparation Example 11 | 100 | Titanium Lactate Ammonium Salt (38) | Matic Acid (5.9) | 3.9 |
| Preparation Example 12 | 100 | Titanium Lactate Ammonium Salt (38) | Citric Acid (5.9) | 4.0 |
| Preparation Example 13 | 100 | Titanium Lactate Ammonium Salt (46) | — | 6.2 |
| Preparation Example 14 | 100 | Sodium Glyoxylate (10) | — | 5.7 |
| Preparation Example 15 | 100 | Titanium Isopropoxy Triethanolaminate (20) | — | 8.6 |

TABLE 1-continued

| Category | Polyvinyl alcohol-Based Resin (Parts by Weight) | Cross-linking Agent (Parts by Weight) | Hydroxycarboxylic Acid (Parts by Weight) | pH |
|---|---|---|---|---|
| Preparation Example 16 | 100 | Tetraisopropyl Titanate (58) | Lactic Acid (8.8) | White Solid Precipitate |
| Preparation Example 17 | 100 | Titanium Lactate Ammonium Salt (58) | Lactic Acid (8.8) | 7.0 |
| Preparation Example 18 | 100 | Titanium Lactate Ammonium Salt (58) | Lactic Acid (8.8) | 2.0 |

Example 1

(1) Preparation of Polarizing Film (Polarizer)

A polyvinyl alcohol film having a thickness of 60 μm was dyed by being immersed in a dyeing solution of iodine and potassium iodide while moving the polyvinyl alcohol film using a guide roll, and the result was oriented by approximately 3 to 6 times. Subsequently, the film was cross-linked by being introduced to a tub of boric acid and potassium iodide, and dried for 5 to 8 minutes at 80° C., and as a result, a polarizing film was obtained.

(2) Preparation of Polarizing Plate

A polarizing plate was prepared by adhering and laminating a saponicated triacetyl cellulose (TAC) film having a thickness of 60 μm to both surfaces of the polyvinyl alcohol-based polarizing film prepared in (1) described above as a protective film using the adhesive prepared in Preparation Example 1, and then drying the result for 5 minutes in an oven at 80° C.

Examples 2 to 12

Polarizing plates were prepared in the same manner as in Example 1 except that the adhesives prepared in Preparation Examples 2 to 12 were used as adhesives.

Comparative Example 1 to 6

Polarizing plates were prepared in the same manner as in Example 1 except that the adhesives prepared in Preparation Examples 13 to 18 were used as adhesives.

Test Example (1) Evaluation on Water Resistance

The polarizing plate prepared in Examples 1 to 12 and Comparative Examples 1 to 6 was cut into pieces having a size of 50 mm×80 mm. Herein, the orientation direction of the polarizing film was employed as a long axis and the direction perpendicular thereto was employed as a short axis. A specimen was prepared by laminating the polarizing plate to glass using the applied pressure sensitive adhesive (PSA) as a medium, and water resistance was evaluated.

Water resistance was evaluated as the degree of peel-off after the specimen was left for 24 hours at a temperature of 60° C. and relative humidity of 100% (using a thermostat). As the degree of peel-off, the quantity peeled off from the end of the polarizing plate, that is, the presence of the discolored area of the polarizer by the peel-off of the polarizing plate was identified. As the degree of peel-off is smaller, water resistance is excellent. The results of the physical property evaluation for the polarizing plates of the examples and the comparative examples are shown in the following Table 2.

<Evaluation Criteria>

⊚ (Very Excellent)—Peeled Area<5%
○ (Excellent)—5%≤Peeled Area<10%
Δ (Insufficient)—10%≤Peeled Area<20%
× (Poor)—20%≤Peeled Area (2) Optical Properties The polarizing plate prepared in Examples 1 to 12 and Comparative Examples 1 to 6 was cut into pieces having a size of 40 mm×40 mm, and this specimen was fixed on a measurement holder, and then single body transmittance (Ts), a degree of polarization, and color (single body a, single body b, orthogonal a, orthogonal b) were measured using a UV-VIS spectrophotometer (V-7100, manufactured by JASCO International Co., Ltd.), and the results are shown in Table 2. The single body transmittance (Ts) and the single body color (a, b) are values measured for one polarizing plate, and orthogonal color (orthogonal a, orthogonal b) was measured after orthogonalizing two cut polarizing plates so that the absorption axes become 90° each other, and the results are shown in Table 2.

The degree of polarization is defined by the following Mathematical Equation 1 using parallel transmittance (Tp) obtained when two polarizing plates are disposed so that the absorption axes are parallel, and orthogonal transmittance (Tc) obtained by orthogonalizing the absorption axes to be 90° to each other.

$$\text{Degree of Polarization} = [(Tp-Tc)/(Tp+Tc)]^{1/2} \quad \text{[Mathematical Equation 1]}$$

TABLE 2

| Category | Single Body Transmittance (%) | Degree of Polarization (%) | Single Body Color a | Single Body Color b | Orthogonal Color a | Orthogonal Color b | Water Resistance Evaluation |
|---|---|---|---|---|---|---|---|
| Example 1 | 42.43 | 99.9942 | −1.84 | 4.30 | 0.25 | −0.54 | ⊚ |
| Example 2 | 42.57 | 99.9935 | −1.74 | 4.03 | 0.30 | −0.69 | ○ |
| Example 3 | 42.49 | 99.9940 | −1.70 | 3.96 | 0.28 | −0.64 | ⊚ |
| Example 4 | 42.60 | 99.9935 | −1.69 | 4.00 | 0.29 | −0.67 | ⊚ |
| Example 5 | 42.57 | 99.9938 | −1.74 | 4.08 | 0.30 | −0.74 | ⊚ |
| Example 6 | 42.55 | 99.9936 | −1.74 | 4.22 | 0.23 | −0.56 | ○ |

TABLE 2-continued

| Category | Single Body Transmittance (%) | Degree of Polarization (%) | Single Body Color a | Single Body Color b | Orthogonal Color a | Orthogonal Color b | Water Resistance Evaluation |
|---|---|---|---|---|---|---|---|
| Example 7 | 42.82 | 99.9941 | −1.72 | 4.05 | 0.36 | −0.92 | ⊚ |
| Example 8 | 42.76 | 99.9949 | −1.74 | 4.13 | 0.43 | −1.09 | ⊚ |
| Example 9 | 42.77 | 99.9950 | −1.73 | 4.09 | 0.41 | −1.05 | ○ |
| Example 10 | 43.25 | 99.9906 | −1.73 | 4.36 | 0.31 | −1.01 | ○ |
| Example 11 | 43.21 | 99.9918 | −1.74 | 4.25 | 0.37 | −1.08 | ○ |
| Example 12 | 43.10 | 99.9920 | −1.80 | 4.37 | 0.35 | −0.99 | ○ |
| Comparative Example 1 | 42.60 | 99.9918 | −2.02 | 4.65 | 0.33 | −0.76 | × |
| Comparative Example 2 | 42.38 | 99.9945 | −1.86 | 4.19 | 0.33 | −0.71 | × |
| Comparative Example 3 | 42.91 | 99.9895 | −2.10 | 4.78 | 0.38 | −1.27 | Δ |
| Comparative Example 4 | Produced white solid precipitates—impossible to use as an adhesive | | | | | | |
| Comparative Example 5 | 42.78 | 99.9935 | −1.77 | 4.22 | 0.39 | −0.89 | × |
| Comparative Example 6 | 42.77 | 99.9937 | −1.78 | 4.23 | 0.34 | −0.79 | × |

As shown in Table 2, it was identified that the adhesives for a polarizing plate according to the present invention all exhibited excellent properties regarding water resistance for water compared to the adhesives in Comparative Examples 1 to 3. The adhesive in Comparative Example 4 using titanium alkoxide had solid precipitates, therefore, was difficult to be used as an adhesive. In addition, it was seen that, when the pH of the adhesive for a polarizing plate was outside 3.5 to 6.5, water resistance was reduced as identified in Comparative Examples 5 and 6.

Figure 5:
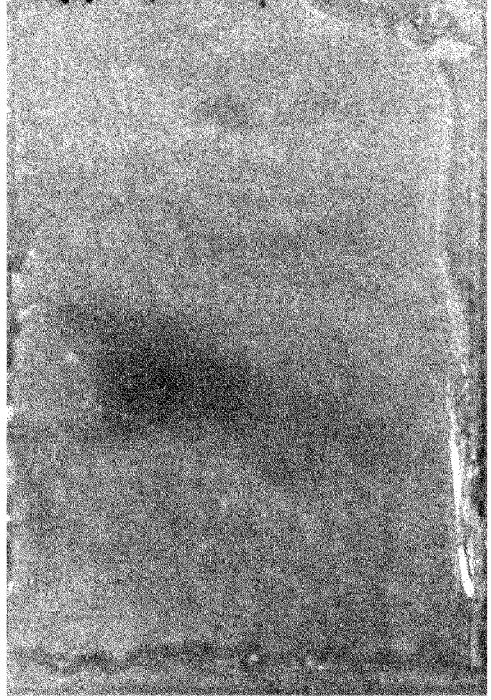
FIG. 5 is a photograph of the surface of a polarizing plate prepared in Comparative Example 1 after water resistance evaluation.
Figure 6:
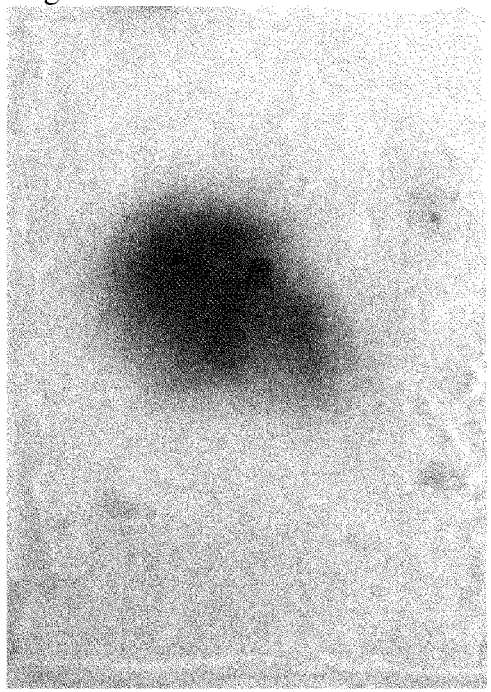
FIG. 6 is a photograph of the surface of a polarizing plate prepared in Comparative Example 2 after water resistance evaluation.
Figure 7:
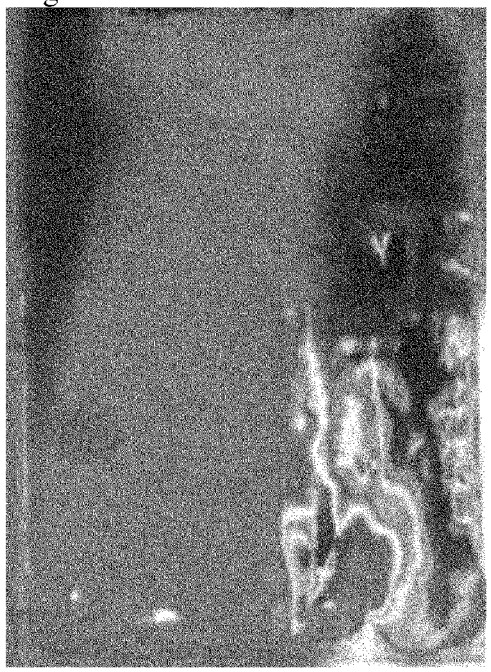
FIG. 7 is a photograph of the surface of a polarizing plate prepared in Comparative Example 5 after water resistance evaluation.

In addition, in FIGS. 1 to 4, it was identified that the polarizing plate prepared in the examples had almost no peel-off phenomenon and an iodine discoloration phenomenon in the polarizer after water resistance evaluation. On the contrary, in FIGS. 5 and 6, it was identified that, when lactic acid was not used or sodium glyoxylate, which has been used in the art, was used, an iodine discoloration phenomenon was seen in most areas of the polarizing plate. In addition, in FIG. 7, it was identified that the peel-off phenomenon also occurred when the pH of the adhesive is outside the range specified in claim 1.

Meanwhile, as shown in Table 2, it was identified that the adhesives for a polarizing plate according to the present invention all exhibited equal or more superior optical properties compared to the adhesives in Comparative Examples 1 to 6.

Hereinbefore, examples of the present invention have been described in detail, however, claims of the present invention are not limited thereto, and it will be apparent to those skilled in the art that various modifications and changes may be made without departing from the spirit of the present invention described in the claims.

The invention claimed is:

1. An adhesive for a polarizing plate having a pH of 3.5 to 6.5, the adhesive comprising:
   a polyvinyl alcohol-based resin;
   titanium lactate ammonium salt;
   hydroxycarboxylic acid; and
   water,
   wherein a weight ratio of the titanium lactate ammonium salt and the hydroxycarboxylic acid is 4:1 to 25:1.

2. The adhesive for a polarizing plate of claim 1, wherein the polyvinyl alcohol-based resin includes one or more types selected from the group consisting of an acetoacetyl group-modified polyvinyl alcohol-based resin, a cation-modified polyvinyl alcohol-based resin and an anion-modified polyvinyl alcohol-based resin.

3. The adhesive for a polarizing plate of claim 1, wherein the hydroxycarboxylic acid is a compound represented by the following Chemical Formula 2:

[Chemical Formula 2]

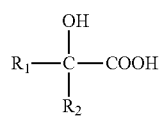

wherein, in Chemical Formula 2, $R_1$ and $R_2$ are each independently a $C_{1-5}$ alkyl group substituted with a hydroxyl group or a carboxyl group, an unsubstituted $C_{1-5}$ alkyl group, hydrogen or a hydroxyl group.

4. The adhesive for a polarizing plate of claim 1, wherein the hydroxycarboxylic acid includes one or more types selected from the group consisting of lactic acid, citric acid, glycolic acid, malic acid, tartaric acid, glyceric acid and gluconic acid.

5. The adhesive for a polarizing plate of claim 1, comprising:
   the titanium lactate ammonium salt in 30 to 150 parts by weight;
   the hydroxycarboxylic acid in 1 to 13 parts by weight; and
   the water in 1000 to 10000 parts by weight, with respect to 100 parts by weight of the polyvinyl alcohol-based resin.

6. A polarizing plate comprising:
   a polarizer;
   a polymer film attached on one or both surfaces of the polarizer; and
   an adhesive layer for attaching the polarizer and the polymer film,
   wherein the adhesive layer is formed using the adhesive for a polarizing plate of claim 1.

7. The polarizing plate of claim 6, wherein the polymer film is a protective film formed with a cellulose-based resin.

8. The polarizing plate of claim 6, wherein a percentage of a peeled area is 10% or less with respect to a total area when the polarizing plate is left for 24 hours at a temperature of 60° C. and relative humidity of 100%.

9. An image display device comprising the polarizing plate of claim 6.

10. A polarizing plate comprising:
a polarizer;
a polymer film attached on one or both surfaces of the polarizer; and
an adhesive layer for attaching the polarizer and the polymer film,
wherein the adhesive layer is formed using the adhesive for a polarizing plate of claim 2.

11. A polarizing plate comprising:
a polarizer;
a polymer film attached on one or both surfaces of the polarizer; and
an adhesive layer for attaching the polarizer and the polymer film,
wherein the adhesive layer is formed using the adhesive for a polarizing plate of claim 3.

12. A polarizing plate comprising:
a polarizer;
a polymer film attached on one or both surfaces of the polarizer; and
an adhesive layer for attaching the polarizer and the polymer film,
wherein the adhesive layer is formed using the adhesive for a polarizing plate of claim 4.

13. A polarizing plate comprising:
a polarizer;
a polymer film attached on one or both surfaces of the polarizer; and
an adhesive layer for attaching the polarizer and the polymer film,
wherein the adhesive layer is formed using the adhesive for a polarizing plate of claim 5.

* * * * *